(12) United States Patent
Parkinson et al.

(10) Patent No.: US 7,275,776 B2
(45) Date of Patent: Oct. 2, 2007

(54) VEHICLE IMPACT ENERGY MANAGEMENT SYSTEM

(75) Inventors: David W. Parkinson, North Ogden, UT (US); Earl H. Nelson, West Haven, UT (US)

(73) Assignee: Autoliv ASP, Inc., Ogden, UT (US)

( * ) Notice: Subject to any disclaimer, the term of this patent is extended or adjusted under 35 U.S.C. 154(b) by 141 days.

(21) Appl. No.: 11/288,514

(22) Filed: Nov. 29, 2005

(65) Prior Publication Data

US 2007/0120384 A1    May 31, 2007

(51) Int. Cl.
*B60R 19/21* (2006.01)
(52) U.S. Cl. .................... 293/135; 296/187.09
(58) Field of Classification Search ............ 293/118, 293/119, 110, 135, 136, 137; 296/187.09
See application file for complete search history.

(56) References Cited

U.S. PATENT DOCUMENTS

| | | | |
|---|---|---|---|
| 5,884,959 A * | 3/1999 | Hillen | ............ 293/134 |
| 5,967,573 A | 10/1999 | Wang | |
| 6,050,624 A | 4/2000 | Kim | |
| 6,056,336 A | 5/2000 | Balgobin | |
| 6,106,038 A | 8/2000 | Dreher | |
| 6,135,251 A * | 10/2000 | Hartlieb et al. | ............ 188/374 |
| 6,174,008 B1 | 1/2001 | Kramer et al. | |
| 6,179,356 B1 * | 1/2001 | Hartlieb et al. | ............ 293/133 |
| 6,189,941 B1 | 2/2001 | Nohr | |
| 6,227,583 B1 * | 5/2001 | Eipper et al. | ............ 293/133 |
| 6,401,565 B1 | 6/2002 | Wang et al. | |
| 6,454,326 B2 | 9/2002 | Demarquilly et al. | |
| 6,554,333 B2 | 4/2003 | Shimotsu et al. | |
| 6,648,384 B2 | 11/2003 | Nees et al. | |
| 6,834,899 B2 | 12/2004 | Lindsey | |

* cited by examiner

*Primary Examiner*—Lori L. Lyjak
(74) *Attorney, Agent, or Firm*—Sally J Brown; Pauley Petersen & Erickson

(57) ABSTRACT

An impact energy management system for absorbing or displacing kinetic energy during a collision. The system includes a housing defining a chamber and a contact element disposed at least partially within the chamber and longitudinally movable therein. A tab extends from a side wall of one of the housing and the contact element. Prior to a collision, the contact element is disposed in an impact position, and upon the collision the contact element moves within the chamber. The tab contacts a side wall portion of an other of the one of the housing and the contact element. The side wall of the housing and/or the contact element tears to absorb or displace kinetic energy during the collision, thereby reducing the force of the impact by transferring energy through the tearing.

20 Claims, 4 Drawing Sheets

VEHICLE IMPACT ENERGY MANAGEMENT SYSTEM

BACKGROUND OF THE INVENTION

This invention relates generally to a collision energy absorbing system and, more particularly, to an impact energy management system for absorbing or displacing kinetic energy upon the occurrence of a motor vehicle collision.

Motor vehicles are a part of everyday life for most individuals around the world. For example, most people use some type of motor vehicle to transport themselves to and from work, to run errands, to attend recreational events, to visit family members and friends, and so forth. Some people use motor vehicles because they provide more convenient transportation than available alternatives. Others use motor vehicles because they find the experience of driving to be enjoyable. Whatever the reasons behind their popularity, the demand for motor vehicles is unlikely to abate anytime in the near future.

Researchers are constantly trying to find ways to improve various aspects of motor vehicles. One significant area of research relates to motor vehicle safety. Unfortunately, motor vehicle collisions cause a large number of injuries and deaths in the United States. Consequently, efforts are constantly being made to increase the safety of motor vehicles, particularly in a collision situation.

One device which is often used to provide increased safety to the occupants of a motor vehicle during a collision is a bumper assembly. A bumper assembly absorbs at least some of the impact or kinetic energy of a collision involving the motor vehicle. Conventional bumper assemblies typically include a stationary bumper that can deform permanently or resiliently during a collision, thereby preventing or reducing the amount of damage to the vehicle frame, adjacent components, and vehicle occupants.

While conventional bumper assemblies typically provide what heretofore has been considered an acceptable level of crash protection, there is a need for an improved collision energy absorbing system to provide additional collision protection for motor vehicles and occupants thereof. There is a need for an efficient, effective and low-cost collision energy absorbing system for absorbing or displacing impact forces of a motor vehicle collision.

SUMMARY OF THE INVENTION

A general object of the invention is to provide an improved collision energy absorbing system for motor vehicles.

A more specific objective of the invention is to overcome one or more of the problems described above.

The general object of the invention can be attained, at least in part, through an impact energy management system for absorbing or displacing kinetic energy during a collision. In accordance with one embodiment, such a system includes a housing defining a chamber. A contact element is disposed at least partially within the chamber and longitudinally movable therein. A tab extends from a side wall of one of the housing and the contact element. Prior to the collision, the contact element is disposed in an impact position and upon the collision the contact element moves within the chamber. The tab contacts a side wall portion of an other of the one of the housing and the contact element, and the side wall of the one of the housing and the contact element tears to absorb or displace kinetic energy during the collision.

Compared to the system of the invention, the prior art generally fails to disclose a simple and efficient system for absorbing a portion of the impact of a vehicle collision.

The invention further comprehends an impact energy management system for absorbing or displacing kinetic energy during a collision that includes a housing defining a chamber and including a housing tab formed in a housing side wall. A contact element is disposed at least partially within the chamber and longitudinally movable therein. The contact element includes a contact element tab formed in a contact element side wall, which is disposed adjacent the housing side wall. Prior to the collision the contact element is disposed in an impact position, and upon the collision the contact element moves within the chamber, the contact element tab contacts the housing tab, and at least one of the housing side wall and the contact element side wall tears to absorb or displace kinetic energy during the collision.

The invention still further comprehends an impact energy management system for absorbing or displacing kinetic energy during a collision. In accordance with one embodiment, such a system includes a housing defining a chamber including a first chamber portion that is wider than a second chamber portion. The housing includes a side wall with a first side wall portion in part defining the first chamber portion and a second side wall portion in part defining the second chamber portion. A side wall opening is disposed between the first and second side wall portions, and a housing tab extends from the second side wall portion adjacent the side wall opening. A contact element is disposed at least partially within the chamber and longitudinally movable therein. The contact element includes a contact element side wall adjacent the housing side wall, and a contact element tab. Prior to the collision, the contact element is disposed in an impact position with the contact element tab disposed in the first chamber portion and bent outward from the contact element side wall toward the housing side wall. Upon the collision the contact element moves within the chamber. The contact element tab contacts the housing tab, and at least one of the housing and the contact element tears to absorb or displace kinetic energy during the collision.

As used herein, references to "adjacent" are to be understood to not necessarily require a direct contact between the two adjacent elements.

Other objects and advantages will be apparent to those skilled in the art from the following detailed description taken in conjunction with the appended claims and drawings.

BRIEF DESCRIPTION OF THE DRAWINGS

FIG. 1 shows the impact energy management system in an impact position before or upon an imminent collision. FIGS. 2 and 3 illustrate the impact energy management system at different stages during a collision.

DETAILED DESCRIPTION OF THE INVENTION

The present invention provides an impact energy management system for absorbing a portion of impact forces during a motor vehicle collision. The impact energy management system uses one or more tabs to deform and/or tear a portion of the system such as, for example, a system housing wall, thereby reducing the force of the impact by transferring energy into the housing deformation and/or tearing. The impact energy management system can be incorporated anywhere in a vehicle where absorption of collision energy is needed or desired, such as, for example, in one or more of the bumpers, seats or the hood of the vehicle. The system of the invention beneficially can provide additional time during a collision for a collision sensor system to analyze the collision and make the appropriate response. The additional time can also desirably provide vehicle safety restraint systems more efficiency in their ability to protect vehicle occupants from injury or death. The system of the invention can also reduce vehicle damage and costly repairs, particularly vehicle body work typically caused by low-speed collisions. The impact energy management system of the invention is relatively simple and inexpensive to produce and install, and easily concealed in various applications.

Figure 1:
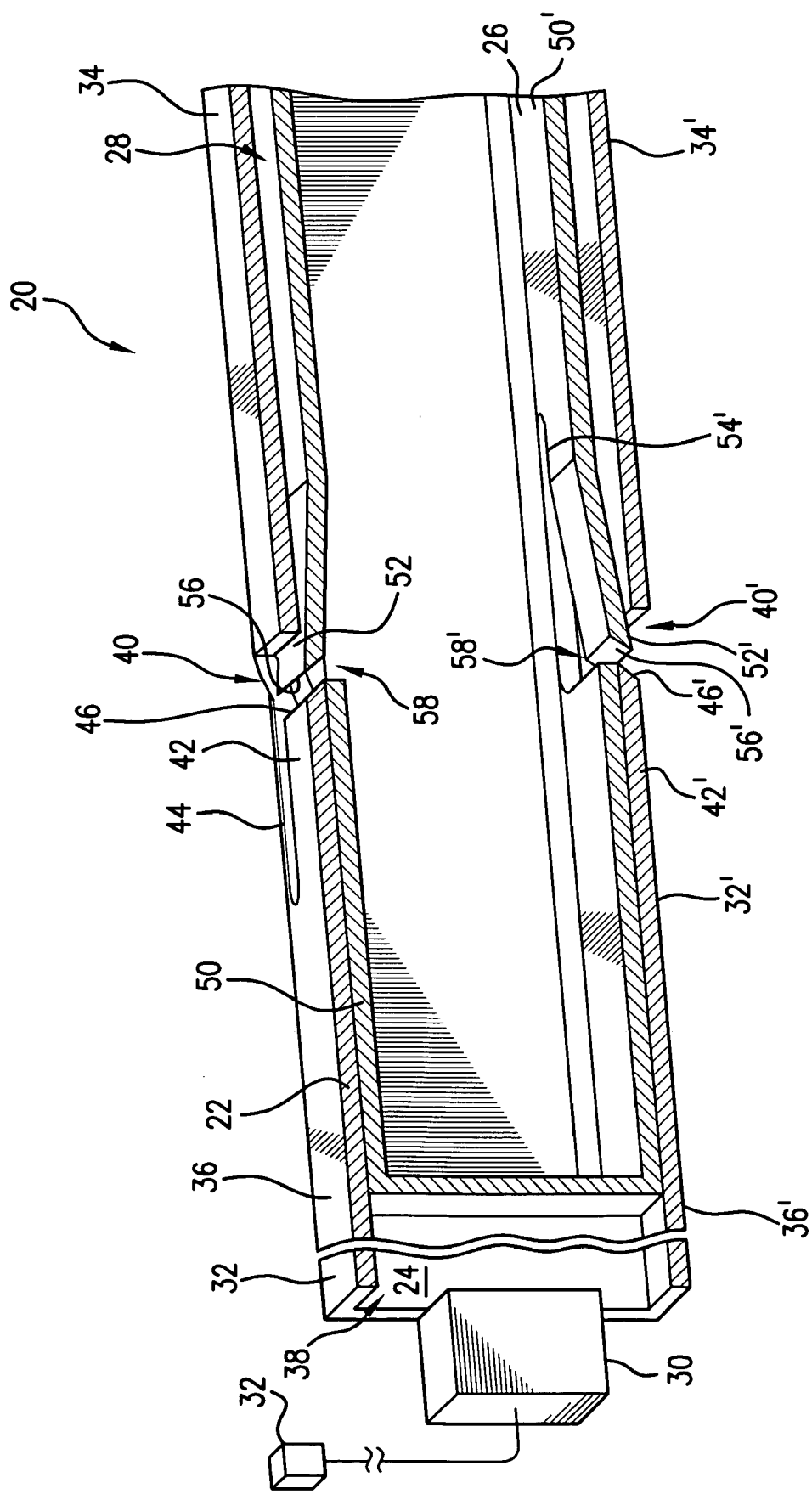
FIGS. 1-3 are partial, sectional views of a general representation of an impact energy management system for absorbing or displacing kinetic energy during a collision, according to one embodiment of this invention.
Figure 2:
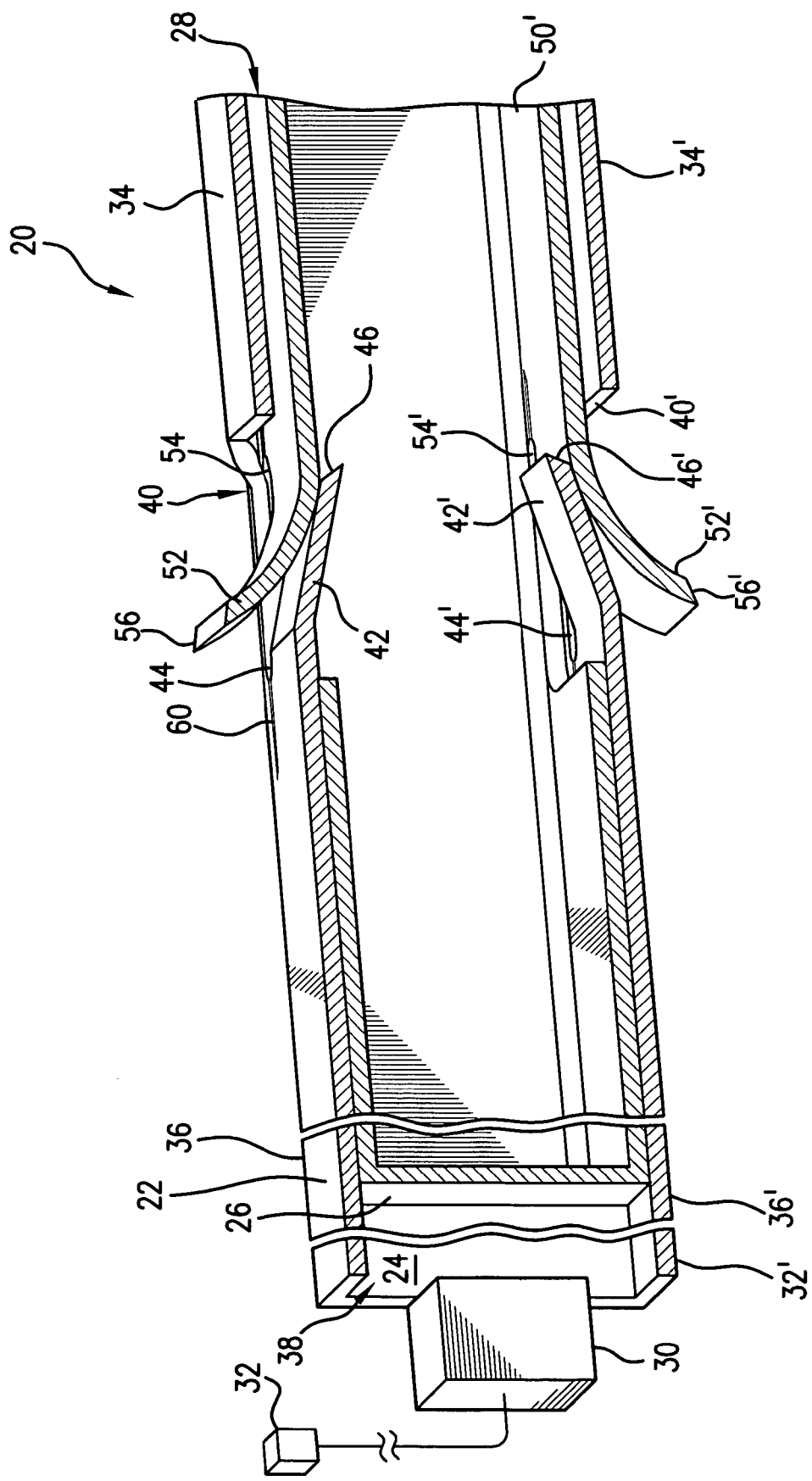
Figure 3:
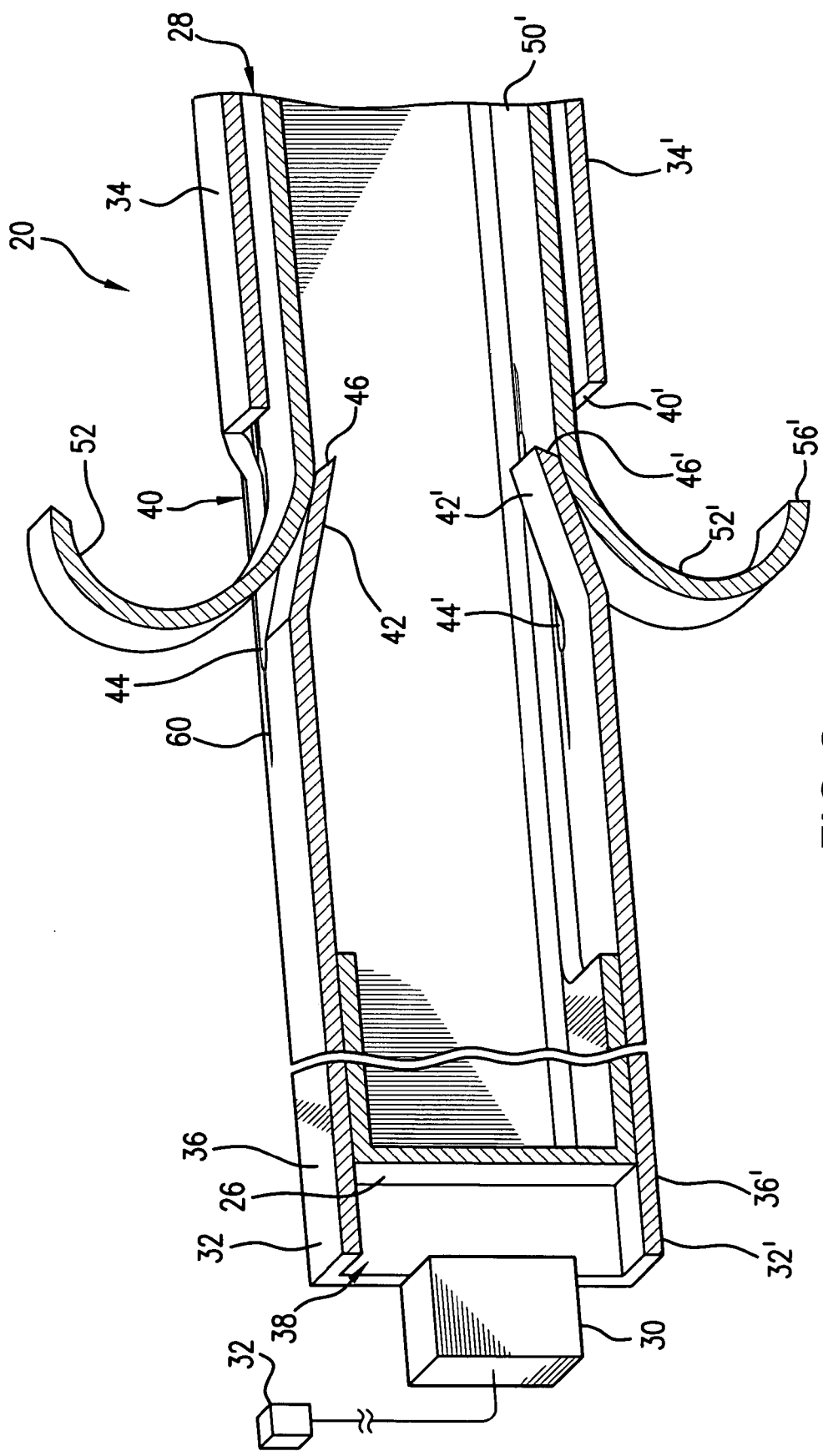

FIGS. 1-3 are partial, sectional views of a general representation of an impact energy management system 20 for absorbing or displacing kinetic energy during a collision, according to one embodiment of this invention. FIG. 1 shows the impact energy management system 20 in an impact position either before or upon a collision. The impact energy management system 20 is placed in the impact position at the time of manufacture or installation, or desirably extends into the impact position upon or just prior to a collision. In one embodiment of the invention, as discussed further below, an imminent collision is detected by a collision sensing device and/or sensor which activates an extension to the impact position. FIGS. 2 and 3 illustrate the impact energy management system 20 during a collision.

The impact energy management system 20 includes an elongated housing 22 defining a chamber 24. A contact element 26 is disposed partially within the chamber 24, and is longitudinally movable therein. The contact element 26 is also elongated and appropriately sized and shaped to move within the chamber 24. As will be appreciated by those skilled in the art following the teachings herein, alternative sizes, shapes and configurations are available for the elongated housing, chamber and contact element of this invention. In one embodiment of this invention, the housing, chamber and/or contact element is/are formed of structural high strength steel.

In one embodiment of the invention, the impact energy management system 20 includes an actuating device 30 for moving the contact element 26 from an inactive position (not shown) within the chamber 24 to the impact position within the chamber 24, shown in FIG. 1, upon or prior to the collision. As will be appreciated by those skilled in the art, incorporating the actuating device of the invention is particularly beneficial in vehicle designs where it may be undesirable to have the bumper extended in the impact position from the time of manufacturing and during general vehicle use, such as for aesthetic, safety or other design reasons. Various and alternative embodiments of the actuating device, such as those known to those skilled in the art, are available for use in the impact energy management system of the invention. FIGS. 1-3 show a general representation of an actuating device 30. The actuating device 30 is at least partially disposed within the chamber 24 and in actuating communication with the contact element 26. Upon receiving an electrical signal, the actuating device 30 moves the contact element 26 from the inactive position to the impact position, and generally in a direction toward the imminent collision. In one preferred embodiment of the invention, the actuating device 30 includes an inflator device, such as including an initiator or squib and a supply of pressurized gas and/or gas generant material. Inflator devices useful in the actuating device 30 of this invention are generally known and available to those skilled in the art of vehicle inflatable safety restraint systems for inflating airbag cushions. The inflation gas produced by the inflator device within the chamber 24 desirably moves the contact element 26 to the impact position.

In one embodiment of this invention, the actuating device 30 is in activating combination with at least one collision sensing device 32. The collision sensing device 32 can be any device or crash sensor which detects a collision involving the vehicle including the system 20 of this invention and provides an electrical signal that is indicative thereof. A wide variety of crash sensors are known and available to those skilled in the art. For example, the collision sensing device 32 may take the form of an electronic accelerometer or incorporate radar, infrared and/or optical collision detection. Alternatively, the collision sensing device 32 may include an electromechanical device that completes an electrical circuit upon detection of sudden deceleration of the motor vehicle. For example, the collision sensing device 32 may incorporate a ball and magnet design that allows a ball to roll forward to complete an electrical circuit by touching two contacts. Alternatively, the collision sensing device 32 may take the form of a spring band and roller design that allows the roller to move forward and close a contact when tension of a spring band is overcome. Alternatively still, the collision sensing device 32 may take the form of a rotating weight design that allows a weight to move a rotor against spring tension to a point where contacts complete an electrical circuit.

Referring to FIG. 1, the chamber 24 includes a first chamber portion 28 that is wider than a second chamber portion 38. The housing 22 includes a housing side wall 32 with a first side wall portion 34 in part defining the first chamber portion 28 and a second side wall portion 36 in part defining the second chamber portion 38. A housing side wall opening 40 is disposed between the first and second side wall portions 34 and 36. A housing tab 42 extends from the second side wall portion 36 and is adjacent the side wall opening 40. The housing tab 42 is a partial cut out of the side wall 32, and is defined on sides by slits in the side wall 32, such as slit 44, and at an angled end surface 46 by the side wall opening 40. In the embodiment shown in FIG. 1, the housing 22 includes a second, opposing housing side wall 32' generally composed in the same configuration and with a duplicate of the elements of the housing side wall 32. Such duplicate, similar components are generally represented in FIGS. 1-3 by the same reference numerals as used for the first set of elements described herein, but with the addition of a prime, "'", to such numeral. For example, the opposing housing side wall 32' includes a housing tab 42' opposite the housing tab 42 in the housing side wall 32.

The contact element 26 includes a contact element side wall 50 that is disposed adjacent the housing side wall 32. A contact element tab 52 extends from the contact element side wall 50, and is disposed in the first chamber portion 28. The contact element tab 52 is a partial cut out of the side wall 50, and is defined on sides by slits in the side wall 50, such as slit 54, and at an angled end surface 56 by a contact element side wall opening 58. The contact element tab 52 is at an angle from the contact element side wall 50, directed outward toward the housing side wall 32. The wider first chamber portion 28 provides spacing between the first side wall portion 34 and the contact element side wall 50 for the outwardly angled extension of the contact element tab 52. In the embodiment shown in FIG. 1, the contact element 26 includes a second, opposing contact element side wall 50' generally composed in the same configuration and with a duplicate of the elements of the contact element side wall 50. Such duplicate, similar components are generally represented in FIGS. 1-3 by the same reference numerals as used for the first set of elements described herein, but with the addition of a prime, "'", to such numeral. For example, the opposing contact element side wall 50' includes a contact element tab 52' opposite the contact element tab 52 in the contact element side wall 50.

In one embodiment of the invention, an optional sleeve or other suitable cover is disposed on or around the housing 22, and over the housing side wall opening 40. As each of the housing 22 and the contact element 26 include an opening, the sleeve or cover may be desirable for particular installations to keep undesirable materials, such as moisture and dirt, from entering the chamber 24 and/or the contact element 26 during vehicle use. The sleeve can be disposed or wrapped around the housing to cover one or more of the housing side wall openings 40 and 40'. Alternatively, one or more covers can be disposed over the housing side wall opening 40 and/or 40'. As will also be appreciated by those skilled in the art following the teachings herein provided, various and alternative sizes, shapes, materials, thicknesses and configurations are available for the sleeve or cover according to the invention. In one embodiment of the invention, the sleeve or cover is made of a polymer material, such as, without limitation, a thermoplastic or rubber material, that either ruptures or otherwise moves out of position upon a collision.

FIG. 2 illustrates the impact energy management system 20 during a collision. During a collision, the impact force of the collision pushes the contact element 26 from the impact position shown in FIG. 1 through the chamber 24 in a direction toward the actuating device 30. As the contact element 26 moves within the chamber 24, the contact element tab 52 contacts the second side wall portion 36, and more particularly the housing tab 42. The contact element tab 52 is deformed or deflected outward through the housing side wall opening 40 upon contact with the housing tab 42. The housing tab 42 also desirably is deformed or deflected inward through the contact element side wall opening 58. The housing and contact element tabs 42 and 52 move or ride inside one another and deform each other in a generally opposite direction. The engagement of the tabs and the deformation leads to tearing of at least one of the housing 22 and the contact element 26. As shown in FIG. 2, a tear 60 begins at and extends from the slit 44. FIG. 3 illustrates the impact energy management system 20 at a later time interval during the collision. The tearing of the contact element 26 has resulted in a curled and lengthened contact element tab 52.

Deforming and tearing of the housing 22 and/or contact element 26 by the engaging tabs 42 and 52 slows the contact element 26 by absorbing or displacing at least a portion of the kinetic energy during the collision. A portion of the force of the collision transfers to the deformed and torn housing 22 and/or contact element 26, thereby desirably reducing the peak forces on an occupant of the colliding motor vehicle during the overall impact of the collision. As will be appreciated, in one embodiment of the invention, only one of the housing and the contact element includes at least one tab, while in another embodiment, both the housing and the contact element include at least one tab. The number and configuration of the tabs according to this invention can vary according to need.

Figure 4:
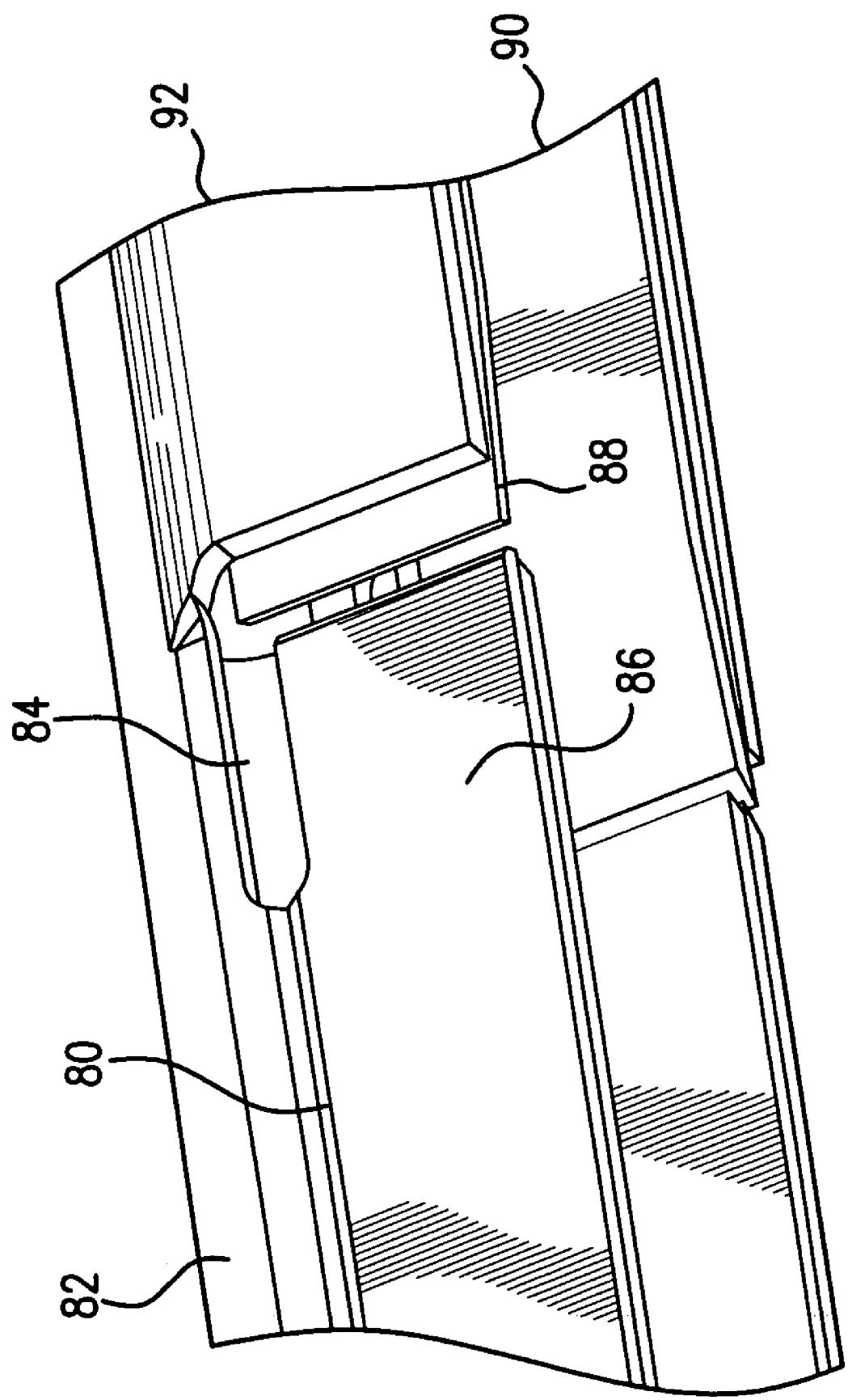
FIG. 4 is a partial, sectional views of a general representation of an impact energy management system for absorbing or displacing kinetic energy during a collision, according to another embodiment of this invention.

FIG. 4 illustrates an impact energy management system according to another embodiment of the invention. The embodiment of FIG. 4 is similar to that described above for FIGS. 1-3, and additionally includes at least one groove, such as a groove 80 in a housing side wall 82. The groove 80 extends from slit 84 defining a housing tab 86, and is formed by cutting into, or otherwise reducing the thickness of, the side wall material. As will be appreciated by those skilled in the art following the teachings herein provided, one or more similar grooves can be alternatively or additionally provided extending from one or more slits defining the contact element tab 88. As the contact element 90 moves within the housing 92 after a collision, the tearing occurs along the groove 80. The groove 80 provides a path for the tearing to follow, thereby promoting more repeatable and straighter tearing of the housing side wall 82 during a collision. As will also be appreciated by those skilled in the art following the teachings herein provided, various and alternative sizes, shapes, and configuration are available for the groove 80.

The impact energy management system of the invention absorbs a portion of the kinetic energy of a collision or crash, thereby reducing the severity of the impact on a passenger of a motor vehicle. The impact energy management system is particularly useful between a front and/or rear bumper and a frame of a motor vehicle, such as an automobile. In one embodiment of the invention, the impact energy management system of the invention is utilized in pairs, such as one at or near each end of a vehicle bumper. Referring to FIGS. 1-3, the contact element 26 may be one of two identical or similar bumper supports onto which the front or rear bumper is attached. The housing 22 may be a portion of the vehicle frame or be attached, such as by bolts or welding, to the vehicle frame. The collision sensing device 32 may include one or more crash sensors disposed within the bumper to detect an imminent collision. However, the impact energy management system of this invention is not intended to be limited to use in bumpers, and can be used in any application where absorption of collision energy is desirable, such as, for example, in the seats and/or the hood of the vehicle.

An advantage of the impact energy management system of the invention is that the energy absorbing frame structure, i.e., the housing and the contact element, can be adapted to absorb varying amounts of kinetic energy. As will be appreciated by those skilled in the art following the teachings herein provided, using different sizes, thicknesses, and types of materials for components such as the tabs, housing, and contact element, allows for various and alternative configurations for managing the energy of a collision such that the peak energy loads on a vehicle occupant are reduced and overall safety is increased.

Another advantage of the system of the invention is that by extending a bumper forward to receive an impact of a collision (e.g., into the position shown in FIG. 1), a collision sensor system has additional time to analyze the collision response of the vehicle. The additional time can desirably provide vehicle safety restraint systems more flexibility in their ability to protect vehicle occupants from injury or death. For example, in a high-speed collision the extension of the bumper by the impact energy management system of the invention can provide for earlier deploying of the seat belt pre-tensioners, thereby keeping the vehicle occupant in a more desirable collision position. In addition, the frontal airbags could be desirably deployed sooner. For low-speed collisions, the seat belt pre-tensioners can also be deployed sooner. Furthermore, the system of the invention can provide a collision analyzing system with additional time to determine if any airbag deployment is even necessary, given the determined properties of the particular low-speed collision. As will be appreciated, various scenarios can be recognized where the additional time provided by the system of the invention allows for improved occupant protection and less cost in repair work and/or safety restraint system replacement.

The system of the invention can also reduce vehicle damage and costly repairs, particularly vehicle body work from low-speed collisions. Often, even in low-speed collisions, damage occurs to grills, hoods and fenders, besides the bumper. By extending the bumper, the impact energy management system of the invention can reduce the potential for damage to other vehicle parts.

The impact energy management system of the invention is relatively simple and inexpensive to produce and install. The housing and/or the contact element can be manufactured in a relatively simple high-speed process such as, for example, a hydro-forming process or a pressing-type process. The system can also be alternatively manufactured as a bolt in place, easily replaceable system extending from the vehicle frame and connecting to the bumper. The system of the invention is easily concealed and can be used with various bumper installations.

As will be appreciated by those skilled in the art following the teachings herein provided, alternative configurations and materials of manufacture are available for the impact energy management system of the invention. The discussion herein refers to additional exemplary embodiments, without limitation, of the impact energy management system of this invention.

Thus, the invention provides an impact energy management system which can be incorporated anywhere in a motor vehicle where absorption of collision energy is needed or desired, such as, for example, in bumpers, seats and/or the hood of the vehicle. The system of the invention provides additional time during a collision for a collision sensor system to analyze the collision and make the appropriate response. The additional time can desirably provide vehicle safety restraint systems more flexibility in their ability to protect vehicle occupants from injury or death. The system of the invention can also reduce vehicle damage and costly repairs, particularly vehicle body work typically caused by low-speed collisions. The impact energy management system of the invention is relatively simple and inexpensive to produce and install, and easily concealed in various applications.

The invention illustratively disclosed herein suitably may be practiced in the absence of any element, part, step, component, or ingredient which is not specifically disclosed herein.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

What is claimed is:

1. An impact energy management system for absorbing or displacing kinetic energy during a collision, the system comprising:
    a housing defining a chamber;
    a contact element disposed at least partially within the chamber and longitudinally movable therein; and
    a tab extending from a side wall of one of the housing and the contact element;
    wherein prior to the collision the contact element is disposed in an impact position and upon the collision the contact element moves within the chamber, the tab contacts a side wall portion of an other of the one of the housing and the contact element, and the side wall of the one of the housing and the contact element tears to absorb or displace kinetic energy during the collision.

2. The impact energy management system according to claim 1 wherein the housing comprises a vehicle frame and the contact element comprises a bumper support for securing a bumper to the vehicle frame.

3. The impact energy management system according to claim 1 wherein the tab comprises a partial cut out of the side wall of the one of the housing and the contact element.

4. The impact energy management system according to claim 3 wherein the tab is bent at an angle from the side wall of the one of the housing and the contact element.

5. The impact energy management system according to claim 1 additionally comprising a side wall opening adjacent the side wall portion of the other of the one of the housing and the contact element, wherein upon the tab contacting the side wall portion of the other of the one of the housing and the contact element the tab extends through the side wall opening.

6. The impact energy management system according to claim 5 wherein the tab comprises an angled end surface which contacts the side wall portion of the other of the one of the housing and the contact element.

7. The impact energy management system according to claim 1 wherein the tab is defined on sides by slits in the side wall of the one of the housing and the contact element, and additionally comprising a groove in the side wall of the one of the housing and the contact element, the groove extending from one of the slits.

8. The impact energy management system according to claim 1 wherein the side wall portion of the other of the one of the housing and the contact element comprises a second tab.

9. The impact energy management system according to claim 1 additionally comprising an actuating device for moving the contact element from an inactive position within the chamber to the impact position within the chamber upon or prior to the collision.

10. An impact energy management system for absorbing or displacing kinetic energy during a collision, the system comprising:
    a housing defining a chamber, the housing including a housing tab formed in a housing side wall; and
    a contact element disposed at least partially within the chamber and longitudinally movable therein, the contact element including a contact element tab formed in a contact element side wall, wherein the contact element side wall is disposed adjacent the housing side wall;
    wherein prior to the collision the contact element is disposed in an impact position and upon the collision the contact element moves within the chamber, the contact element tab contacts the housing tab, and at least one of the housing side wall and the contact element side wall tears to absorb or displace kinetic energy during the collision.

11. The impact energy management system according to claim 10 wherein the housing comprises a vehicle frame and the contact element comprises a bumper support for securing a bumper to the vehicle frame.

12. The impact energy management system according to claim 10 additionally comprising a second housing tab formed in an opposing housing side wall, and a second contact element tab formed in an opposing contact element side wall.

13. The impact energy management system according to claim 10 wherein the contact element tab is bent outward from the contact element side wall toward the housing side wall.

14. The impact energy management system according to claim 10 wherein each of the housing tab and the contact element tab comprises an angled end surface.

15. The impact energy management system according to claim 14 additionally comprising a side wall opening in the housing side wall and adjacent the angled end surface of the housing tab, wherein upon the contact element tab contacting the housing tab the contact element tab extends through the side wall opening.

16. The impact energy management system according to claim 10 wherein the housing tab is defined on sides by slits in the housing side wall and the contact element tab is defined on sides by slits in the contact element side wall.

17. The impact energy management system according to claim 16 additionally comprising a groove in at least one of the housing side wall and the contact element side wall, the groove extending from one of the slits.

18. An impact energy management system for absorbing or displacing kinetic energy during a collision, the system comprising:

a housing defining a chamber including a first chamber portion that is wider than a second chamber portion, the housing including a side wall with a first side wall portion in part defining the first chamber portion and a second side wall portion in part defining the second chamber portion, a side wall opening disposed between the first and second side wall portions, and a housing tab extending from the second side wall portion adjacent the side wall opening;

a contact element disposed at least partially within the chamber and longitudinally movable therein, the contact element including a contact element side wall adjacent the housing side wall and the contact element including a contact element tab;

wherein prior to the collision the contact element is disposed in an impact position with the contact element tab disposed in the first chamber portion and bent outward from the contact element side wall toward the housing side wall, and upon the collision the contact element moves within the chamber, the contact element tab contacts the housing tab, and at least one of the housing and the contact element tears to absorb or displace kinetic energy during the collision.

19. The impact energy management system according to claim 18 wherein the housing tab is defined on sides by slits in the housing side wall and the contact element tab is defined on sides by slits in the contact element side wall.

20. The impact energy management system according to claim 19 additionally comprising a groove in at least one of the housing side wall and the contact element side wall, the groove extending from one of the slits.

* * * * *